Figure 1:
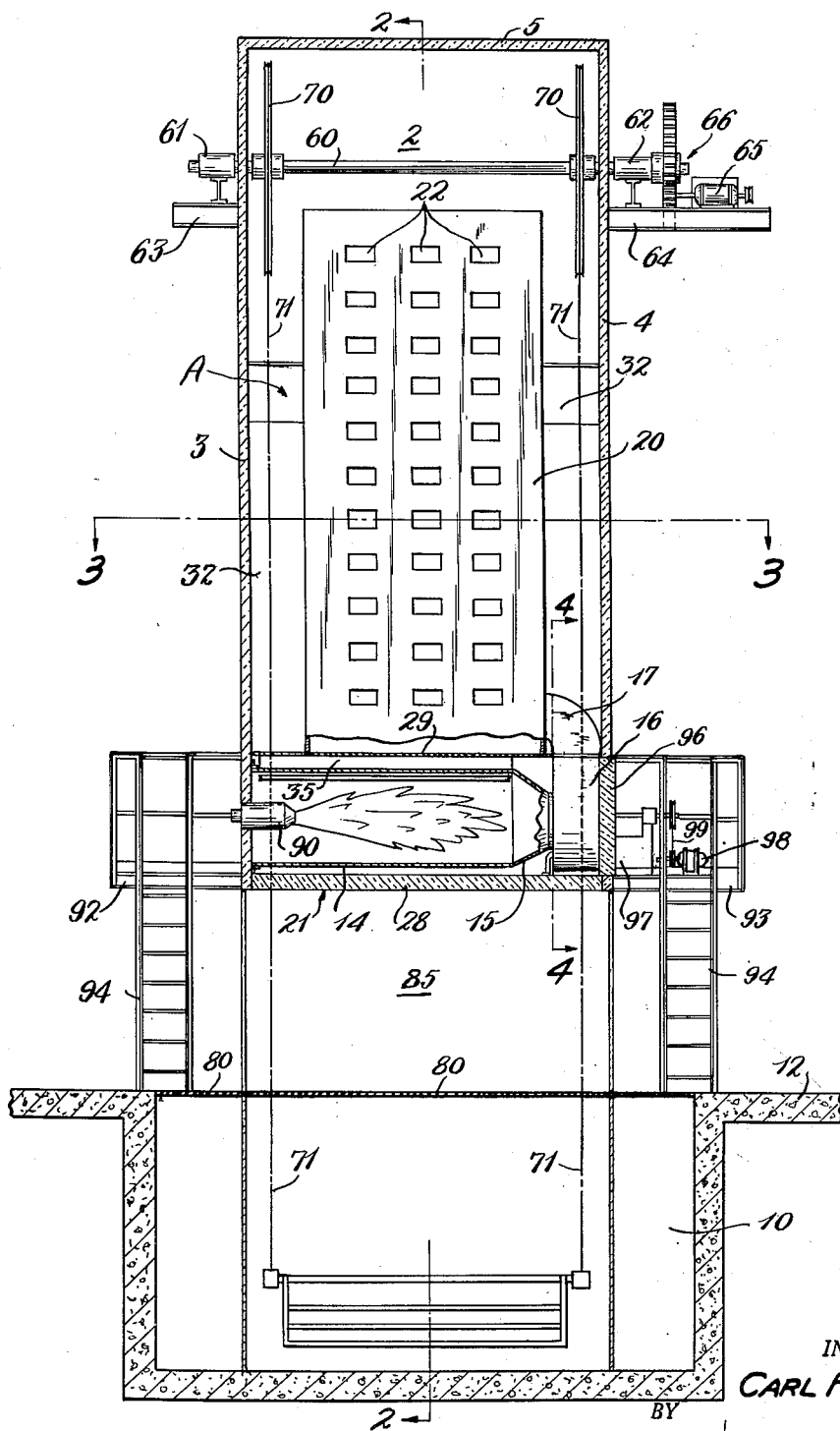

INVENTOR.
CARL F. MAYER
BY West+Oldham
ATTORNEYS

INVENTOR.
CARL F. MAYER
BY West & Oldham
ATTORNEYS

Feb. 10, 1953 C. F. MAYER 2,628,087
HEATING SYSTEM FOR VERTICAL INDUSTRIAL
OVENS OF THE CONVEYER TYPE
Filed Feb. 18, 1950 3 Sheets-Sheet 3

INVENTOR.
CARL F. MAYER
BY
West T Oldham
ATTORNEYS

Patented Feb. 10, 1953

2,628,087

UNITED STATES PATENT OFFICE 2,628,087

HEATING SYSTEM FOR VERTICAL INDUSTRIAL OVENS OF THE CONVEYER TYPE

Carl F. Mayer, Lakewood, Ohio

Application February 18, 1950, Serial No. 145,047

5 Claims. (Cl. 263—8)

This invention pertains to vertical ovens of the conveyor type that are used in the industries for drying cores or molds, or for heat treating articles of manufacture, or for drying or baking enamel or other surface coatings on such articles.

The present invention consists of improvements in the vertical oven of my former Patent No. 2,257,180, dated September 30, 1941. A very important feature of my patented oven, and present in the instant invention, is the enclosing of the combustion chamber within the walled structure of the oven, and closing or sealing it against direct supply communication with the interior of the oven. In the case of the patent, a heat supply and recirculating fan, and much of the associated duct work or conduits, are located outside the walls of the oven. This fan and duct work serve to withdraw the products of combustion from the combustion chamber and return them, at a remote point, to a distributor inside the oven. As a consequence of their being located outside the oven, heat loss occurs, considerable duct work is required, and insulation of the exposed parts is expensive and only measurably effective.

An object of this invention is to provide a heating and recirculating system for vertical industrial ovens of the conveyor type that is entirely enclosed within the walls of the oven and thus conserves heat, economizes in materials, and requires less external platform area in the zone of the heating and circulating apparatus. Other advantages arising from this arrangement are compactness and improved appearance, and the elimination of insulating needs for any of the parts of the heat circulating system.

Another object of the invention is to enclose the combustion chamber casing, and desirably the heat supply and recirculating fan, within a housing so as to protect the combustion chamber casing from falling treated material which may accidentally be dislodged from the conveyor. While I do not wish to limit the invention in all instances to the inclusion of such a housing, this feature is desirable because, in addition to protecting the combustion chamber casing, it insulates the oven from heat radiated from said casing, thus affording better heat control within the oven, and allowing lower combustion chamber temperatures relative to oven temperature. The housing may be spaced from the combustion chamber casing so as to provide a dead air space between the two, or to accommodate insulating material.

Because of the nature of the invention, and the huge size of ovens of the kind in which it is incorporated, it is found necessary to illustrate the invention in a rather diagrammatic way in the accompanying drawings; and as I proceed to describe the invention by reference thereto, using like reference characters to designate like parts in the several views, objects and advantages additional to those above enumerated will appear.

Figure 2:
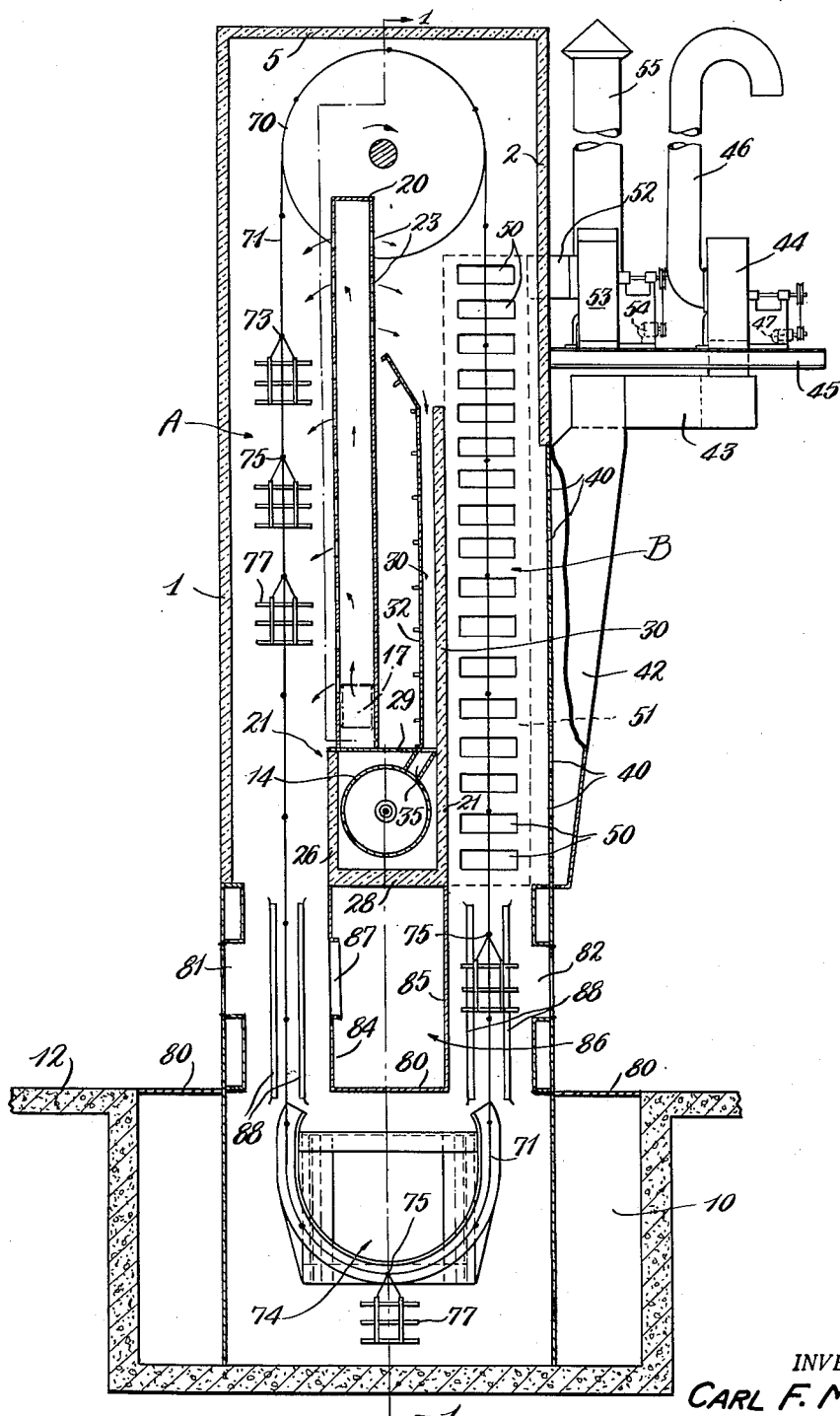
Figure 3:
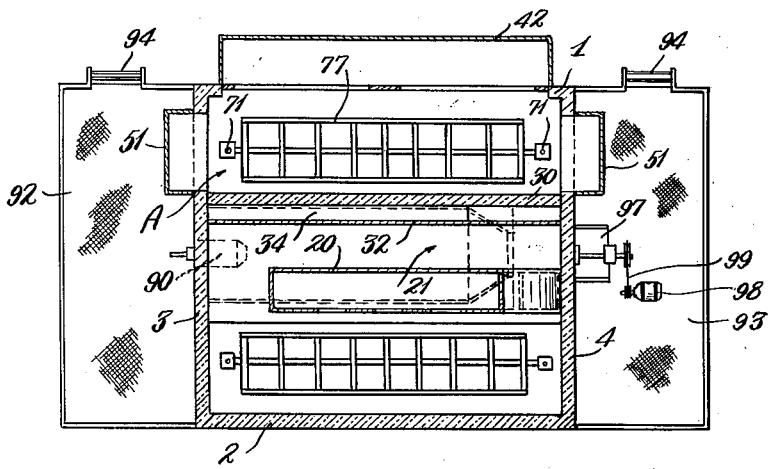
Figure 4:
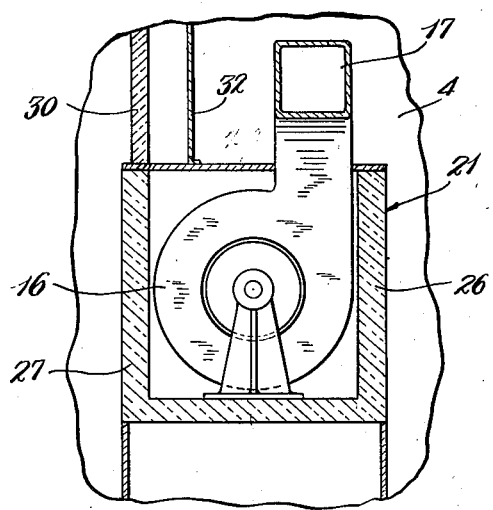

In the drawings, Fig. 1 is a sectional front elevation of a vertical industrial oven embodying my improvements, the section being taken in offset planes, as indicated by the line 1—1 of Fig. 2; Fig. 2 is a sectional side elevation, substantially on the line 2—2 of Fig. 1; Fig. 3 is a sectional plan of the oven, on the line 3—3 of Fig. 1, and Fig. 4 is a sectional detail on the line 4—4 of Fig. 1.

The oven comprises a front wall 1, a rear wall 2, side walls 3 and 4, and a top wall 5. The parts of these walls that enclose the heated chamber A in which the work is dried or otherwise treated, are, in accordance with common practice, made of heat insulating and other material, as conventionally shown in the drawings. The other parts of said walls may be of steel plate, as customary in such structures. The oven structure rises from the bottom of a pit 10 of suitable depth below the floor level 12.

At a suitable distance over head-height above the floor level 12, a heating or combustion chamber casing 14 is located within the oven, substantially midway between the front and rear walls 1 and 2. This casing may be of any suitable form, but as shown in the drawings it consists of a cylinder, preferably composed of a suitable metal alloy, and it has one of its ends engaged with the side wall 3. The opposite end of the casing is made frusto-conical, as indicated at 15, where it joins the inlet of the casing of a heat supply and recirculating fan or blower 16. The casing of this fan or blower is of the common snail shell or scroll design, and its outlet communicates, through a relatively short curved duct 17, with a distributor 20. This distributor consists of a tall, wide and relatively shallow from front-to-rear rectangular casing of sheet metal of suitable gauge, and it is shown as supported above a rectangular housing 21 that encloses the combustion chamber casing 14. The distributor 20 is spaced a substantial distance from, and is parallel to, the front wall 1 of the oven and its side adjacent said wall is provided with outlet openings 22 that are spaced apart transversely and vertically of the distributor substantially throughout the area of said side thereof. Similar openings 23 are made in the rear side of the distributor adjacent its upper end. The aforesaid housing 21, which encloses the combustion chamber casing 14, and preferably, also, the heat supply and recirculating fan 16, is made up of insulated front, back and bottom walls 26, 27 and 28, respectively, and a metal plate top wall 29. The rear insulated wall 27 of the housing is extended upwardly to provide a shield, designated 30. Spaced a suitable distance forwardly from and parallel to the shield 30 is a wall 32, which may be constructed of steel plate and reinforcing or stiffening elements, said wall flaring forwardly at its upper end, at about the elevation of the top of the shield 30, toward the distributor 20. A wide but relatively shallow so-called return duct 34 is thus provided between the shield 30 and the wall 32 which communicates at its lower end, through a connection 35, with the combustion chamber casing 14.

The heated chamber A extends from one side wall to the other of the oven and its limits otherwise are generally defined by the insulated portions of the front wall 1 and rear wall 2, and by the top wall 5. Its lower limit, at the rear, is at about the top of the shield 30, and, at the front, at approximately the bottom of the housing 21. The space to the rear of the shield 30 and housing 21 constitutes a cooling zone B. Throughout the vertical extent of said cooling zone, the rear wall 2 of the oven structure is provided with openings 40, and through these openings said zone communicates with a duct 42 that is located on the exterior of said rear wall and has connection, through a conduit 43, with the outlet of the casing of a so-called cooling fan or blower 44, supported on a platform 45 that extends rearwardly from the oven. Fresh air is conducted to the inlet of said fan or blower through a duct 46. The cooling fan is driven in the usual way by a motor 47 on the platform 45.

Throughout the vertical extent of the cooling zone B, and for a suitable distance thereabove, the side walls 3 and 4 of the oven structure are provided with openings 50 through which said zone communicates with ducts 51 that are applied to the exterior of the side walls. Said ducts communicate at their upper ends, through conduits 52, with the inlet of the casing of an exhaust fan or blower 53, also supported by the previously mentioned platform 45, and which fan or blower is driven by a motor 54. The outlet of the casing of the exhaust fan or blower 53 communicates with a discharge stack 55.

Extending transversely of the oven adjacent the top thereof and outwardly through holes in the side walls 3 and 4 is a shaft 60 that is journaled in bearings 61 and 62. These bearings are mounted on supports 63 and 64, that extend laterally from the oven structure, the latter support mounting a motor 65 that drives the shaft 60 through gearing designated generally by the reference numeral 66. Fastened to the shaft 60 inside the oven in close proximity to the side walls 3 and 4 are large sprocket wheels 70 about which endless conveyor chains 71 are engaged. The sprocket wheels are rotated in the direction indicated by the arrow in Fig. 2 to propel the conveyor chains upwardly adjacent the front wall 1 and downwardly adjacent the rear wall 2. The chains operate through guiding and take-up means located in the pit 10 and designated generally by the numeral 74. Cross bars 75 are supported at their ends by the opposed chains 71, and suspended from each bar 75 is a rack 77 that carries the cores, molds or other articles that are to be dried, baked or heat treated. It will be understood that cross bars 75, with their suspended racks, are substantially equally spaced apart about the chains, although only a limited number of bars and racks are shown in the drawings for the sake of clearness. Obviously other forms of supports than the racks 77 may be employed where they would be more appropriate for the kinds of articles being handled.

Flooring 80 of steel plates, grills, or other suitable elements extends across the top of the pit 10 at the floor level 12, the same being interrupted for the passage of the conveyor chains 71 and racks 77.

At a suitable elevation above the flooring 80, the front wall 1 and rear wall 2 of the oven are provided with loading and unloading openings 81 and 82, respectively, and set off by walls 84 and 85, between the front and rear flights of the conveyor chains, is a passageway 86, the wall 84 having an opening 87 for access to the front flight of the conveyor. Accordingly, the racks rising through the oven from the pit 10 may be loaded from either their front or rear sides; and treated material may be removed from the descending racks through the opening 82. Where the conveyor chains and racks pass the loading and unloading openings, they are held against appreciable sway from front-to-rear by guides 88.

Hereinbefore I have made reference to the heating or combustion chamber 14. These alternative terms are employed because I do not wish to restrict the invention to the use of any particular heating medium. Gas, oil or other kinds of fuel may be employed, or electrical space heaters or other types of heat radiating elements may be placed within the heating chamber, herein disclosed as the interior of the casing 14. In the present illustration, I have shown, in a conventional manner, a burner 90 projecting through the side wall 3 into the end of the casing 14 remote from the heat supply and recirculating fan 16. This burner is supplied with fuel from a suitable source (not shown).

Platforms 92 and 93 extend from the sides of the oven structure in the plane of the bottom wall 28 of the housing 21, and they are conveniently reached by ladders 94. The burner 90, with its usual adjustments and controls, is accessible from the platform 92, while the heat supply and recirculating fan 16 may be reached from the platform 93 by the removal of an access door 96 in the side wall 4. The shaft of the fan 16 extends through an opening in the wall 4 and is journaled in the bearings of a pedestal 97 that is sustained by the platform 93. The platform also mounts a motor 98 that drives the fan through operative connections 99.

Assuming that all motors are energized to operate the heat supply and recirculating fan 16; the conveyor chains 71, and the ventilating system including the fresh air supply fan 44 and the exhaust fan 53, operation of the apparatus will now be described. With the burner 90, or other heating means in operation, the products of combustion, or the heated fluid or gases, are withdrawn by the fan 16 from the casing 14 and expelled through the connecting duct 17 into the distributor 20. This transfer is made with no appreciable heat loss because of the proximity of the fan to both the heating or combustion chamber and distributor and by reason of the fact that all of these parts are inside the insulated walls of the oven. This heat conservation is further promoted by the location of the heating chamber and fan within the housing 21; and as pointed out in the beginning, lower temperatures in the heating or combustion chamber are required than in such a construction as that disclosed in my previously mentioned patent, where the heat supply and recirculating fan and duct work are located exteriorly of the oven and quite remote from the distributor.

As the articles to be treated, supported by the racks 77, traverse the heated chamber A, they are subjected to the blasts of hot fluid or gases issuing through the openings 22 and 23 of the distributor 20. Continuing downwardly through the cooling zone B, the articles receive the blasts of fresh, cool air issuing from the openings 49. Obviously, there is a temperate region between the heated chamber and cooling zone through which the articles pass and which gradually lowers the temperature of the articles, this being the result of the commingling of the fluid or gases from said chamber and zone. The fresh air, as it becomes heated by contact with the articles, is sucked out through the openings 50 and carried, by the ducts 51 and conduits 52, to the exhaust blower 53 and are finally discharged through the stack 55. Fluid or gases from the top rear portion of the heated chamber are drawn downwardly through the return duct 34 and thence through the connection 35 to the heating or combustion chamber casing 14 where they are re-heated before being recirculated by the fan 16.

While I have disclosed the present preferred embodiment of my invention, I wish it to be understood that changes and modifications may be made without departing from the spirit of the invention so long as they fall within the scope of the appended claims. For example, without losing any benefits of said embodiment the character and construction of the distributor and return duct may be altered so long as their functions are preserved. The important feature of the invention resides in having the heating chamber closed against direct passage of heat therefrom to the heated chamber, and the inclusion of fluid impelling and conducting means, which, with said heating chamber is enclosed within the walled structure, for withdrawing the heated fluid from the heating chamber and blasting it into the heated chamber, together with suitable fluid return means for conveying fluid from the heated chamber to the heating chamber.

Having thus described my invention, what I claim is:

1. An oven comprising an elongated vertically arranged walled structure enclosing a heated chamber, a housing made up of insulated front, back and bottom walls and a top wall situated within said structure with said front and back wall in spaced relation to opposed vertical walls thereof and intermediate the top and bottom of the structure, a casing enclosing a heating chamber and situated within said housing, said casing being closed against communication with the housing and against direct supply communication with the heated chamber, fluid impelling means within the housing beyond one end of the casing and having an inlet communicating with said casing, a fluid distributor and a fluid return duct in the heated chamber, said fluid impelling means having an outlet, fluid conveying means through which communication is established between the outlet of said fluid impelling means and the distributor, said fluid conveying means being located entirely within the walled structure, a connection establishing communication between the fluid return duct and the casing enclosing the heating chamber, a hydrocarbon burner arranged to discharge its products of combustion into the casing for heating said chamber, means for operating the fluid impelling means, conveyor guide means within the walled structure, an endless conveyor supported by said guide means with vertical flights of the conveyor disposed on opposite sides of the aforesaid housing and extending substantially from top to bottom of the walled structure, and means for driving the conveyor, said fluid distributor having outlet means arranged to project the heated fluid generally across the path of movement of the conveyor substantially throughout the distance of the conveyor's travel through the heated chamber, opposed walls of said structure having, respectively, a loading opening and an unloading opening below the horizontal plane of said housing.

2. An oven comprising an elongated vertically arranged walled structure including vertical front, rear and side walls and enclosing a heated chamber, a housing made up of insulated front, back and bottom walls and a top wall situated within said structure with its front and back walls in spaced relation to the front and rear walls thereof and intermediate the top and bottom of the structure, all of the aforesaid walls of the housing extending from one to the other of the side walls of the structure, a casing enclosing a heating chamber and situated within said housing, said casing being closed against communication with the housing and against direct supply communication with the heated chamber, fluid impelling means also located within said housing beyond one end of the casing and having an inlet communicating with said casing, a fluid distributor and a fluid return duct in the heated chamber, said fluid impelling means having an outlet, fluid conveying means through which communication is established between the outlet of said fluid impelling means and the distributor, said fluid conveying means being located entirely within the walled structure, a connection establishing communication between the fluid return duct and the casing enclosing the heating chamber, a hydrocarbon burner arranged to discharge its products into the casing for heating said chamber, means for operating the fluid impelling means, conveyor guide means within the walled structure, an endless conveyor supported by said guide means with a vertical flight thereof on each side of the aforesaid housing and extending substantially from top to bottom of the walled structure, and means for driving the conveyor, said fluid distributor having outlet means arranged to project the heated fluid generally across the path of movement of the conveyor substantially throughout the distance of the conveyor's travel through the heated chamber, opposed walls of said structure having, respectively, a loading opening and an unloading opening below the horizontal plane of said housing.

3. An oven comprising an elongated vertically arranged walled structure including front and rear walls and enclosing a heated chamber, a casing enclosing a heating chamber and extending from one side wall of the structure to near the opposite side wall thereof and being situated in spaced relation to the front and rear walls of the structure, said casing being closed against direct supply communication with the heated chamber, a heat supply and recirculating fan including a casing having an inlet wherewith the last mentioned end of the former casing communicates, said fan being inside the walled structure and located adjacent said opposite side wall, a tall, wide and relatively shallow from front-to-rear fluid distributor rising within the heated chamber above said heating chamber casing in spaced relation to the front wall of the structure, the casing of the fluid impeller having an outlet, communicative connections between said outlet and a part of the fluid distributor adjacent the impeller, said connections being entirely within the walled structure, the distributor having outlet openings substantially throughout its side nearest the front wall of the structure and outlet openings in its opposite side adjacent its upper end, a fluid return duct situated within and disposed transversely of the structure above the first mentioned casing in substantially spaced relation to the distributor and to the rear wall of the structure, communicative connections between the bottom of the return duct and the casing enclosing the heating chamber, a hydrocarbon burner arranged to discharge its products of combustion into the casing for heating the latter chamber, means for driving the fluid impeller, conveyor guide means within the walled structure, an endless conveyor supported by said guide means to provide two vertical flights one of which is between the heating chamber casing and the front wall of the structure and the other between the heating chamber casing and the rear wall of the structure and extending substantially from top to bottom of said structure, and means for driving the conveyor in a direction to cause the first mentioned flight to rise and the second mentioned flight to descend, the front and rear walls of said structure having, respectively, a loading opening and an unloading opening below the horizontal plane of the casing enclosing the heating chamber.

4. An oven comprising an elongated vertically arranged walled structure including front, rear and side walls and enclosing a heated chamber, a housing situated within said structure in spaced relation to the front and rear walls thereof and extending from one side wall to the other of said structure, said housing being composed of insulated front, rear and bottom walls and a top wall and being located intermediate the top and bottom of the structure, a fluid distributor consisting of a tall, wide and relatively shallow from front-to-rear rectangular casing disposed transversely of the structure and rising from the housing in spaced, parallel relation to the front wall of the structure, said distributor having outlet openings substantially throughout its side opposite the front wall and a plurality of outlet openings in its rear side adjacent the top thereof, a wide and shallow from front-to-rear fluid return duct rising from said housing in rearwardly spaced relation to the fluid distributor, said return duct being open at its top at an elevation below the openings on the rear side of the distributor, a casing enclosed by said housing and closed against communication therewith and enclosing a heating chamber, a hydrocarbon burner arranged to discharge its products of combustion into the casing for heating said chamber, said casing being closed against direct supply communication with the heated chamber, a communicative connection between the fluid return duct and the heating chamber casing, a heat supply and recirculating fan also located within said housing, said fan including a casing having an inlet and the heating chamber casing having an outlet that is communicatively connected to the inlet of the fan casing, the latter casing having an outlet, a relatively short duct located entirely within the walled structure and through which communication is established between the outlet of the fan casing and the fluid distributor, means for driving the heat supply and recirculating fan, conveyor guide means within the walled structure, an endless conveyor supported thereby with one vertical flight adjacent the front wall, and a second vertical flight adjacent the rear wall of said structure, and means for driving said conveyor in a direction to cause the former flight to ascend and the latter flight to descend, the front and rear walls of said structure having, respectively, a loading opening and an unloading opening below the horizontal plane of the housing.

5. An oven comprising an elongated vertically arranged walled structure enclosing a heated chamber, a housing within said structure in spaced relation to the front and rear walls thereof and extending from one side wall to the other of said structure, said housing being intermediate the top and bottom of the structure and comprising insulated front and rear walls that are substantially parallel to the corresponding walls of the structure, an insulated bottom wall, and a top wall, a fluid distributor consisting of a tall, wide and relatively shallow from front-to-rear rectangular casing disposed transversely of the structure and rising from the housing in spaced, substantially parallel relation to the front wall of the structure, said distributor having outlet openings substantially throughout its side opposite the front wall of the structure and a plurality of outlet openings in its rear side adjacent the top thereof, an insulated shield extending from one side wall to the other of the structure and rising from the aforesaid housing in substantially the plane of the rear wall of the latter to a height near the openings in the rear side of the distributor, a transverse wall rising from the top wall of the housing in forwardly spaced substantially parallel relation to said shield and terminating at its upper end in the region of the corresponding end of the shield, a casing enclosed by said housing and enclosing a heating chamber, a hydrocarbon burner arranged to discharge its products of combustion into the casing for heating said chamber, said casing being closed against direct supply communication with the heated chamber, communicative connections between the return duct and said casing, a heat supply and recirculating fan also located within said housing, said fan including a casing having an inlet and the heating chamber casing having an outlet that is communicatively connected to the inlet of the fan casing, the latter casing having an outlet, a relatively short duct located entirely within the walled structure and through which communication is established between the outlet of the fan casing and the fluid distributor, means for driving the heat supply and recirculating fan, conveyor guide means within the walled structure, an endless conveyor supported thereby with one vertical flight adjacent the front wall, and a second vertical flight adjacent the rear wall of said structure, and means for driving said conveyor in a direction to cause the former flight to ascend and the latter flight to descend, the front and rear walls of said structure having, respectively, a loading opening and an unloading opening below the horizontal plane of the housing.

CARL F. MAYER.

REFERENCES CITED

The following references are of record in the file of this patent:

UNITED STATES PATENTS

| Number | Name | Date |
|---|---|---|
| 1,695,224 | Besta | Dec. 11, 1928 |
| 1,934,904 | Barnett et al. | Nov. 14, 1933 |
| 2,257,180 | Mayer | Sept. 30, 1941 |
| 2,414,312 | Lee | Jan. 14, 1947 |

FOREIGN PATENTS

| Number | Country | Date |
|---|---|---|
| 532,380 | Germany | Aug. 27, 1931 |